(12) United States Patent
Huang et al.

(10) Patent No.: US 11,703,333 B2
(45) Date of Patent: Jul. 18, 2023

(54) METHOD AND APPARATUS FOR DETERMINING ROUTE, DEVICE AND COMPUTER STORAGE MEDIUM

(71) Applicant: BAIDU ONLINE NETWORK TECHNOLOGY (BEIJING) CO., LTD., Beijing (CN)

(72) Inventors: Jizhou Huang, Beijing (CN); Hao Zhang, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 214 days.

(21) Appl. No.: 17/276,815

(22) PCT Filed: May 20, 2020

(86) PCT No.: PCT/CN2020/091420
§ 371 (c)(1),
(2) Date: Mar. 16, 2021

(87) PCT Pub. No.: WO2021/103440
PCT Pub. Date: Jun. 3, 2021

(65) Prior Publication Data
US 2022/0065632 A1    Mar. 3, 2022

(30) Foreign Application Priority Data
Nov. 26, 2019 (CN) .......................... 201911173279.2

(51) Int. Cl.
*G01C 21/30* (2006.01)
*G06T 7/181* (2017.01)
(Continued)

(52) U.S. Cl.
CPC ............. *G01C 21/30* (2013.01); *G01C 21/20* (2013.01); *G01C 21/3407* (2013.01);
(Continued)

(58) Field of Classification Search
None
See application file for complete search history.

(56) References Cited

U.S. PATENT DOCUMENTS

2008/0319661 A1   12/2008   Werner et al.
2010/0148990 A1    6/2010   Burgin et al.
(Continued)

FOREIGN PATENT DOCUMENTS

CN   102538791 A   7/2012
CN   102564444 A   7/2012
(Continued)

OTHER PUBLICATIONS

International Search Report and Written Opinion, PCT Application No. PCT/CN2020/091420, dated Aug. 26, 2020, 12 pages.
(Continued)

*Primary Examiner* — Vivek D Koppikar
*Assistant Examiner* — David Ruben Pedersen
(74) *Attorney, Agent, or Firm* — Kwan & Olynick LLP

(57) ABSTRACT

The present application discloses a method and apparatus for determining a route, a device and a computer storage medium, and relates to the field of big data. An implementation includes: acquiring route description information input by a user, and acquiring a route contour with the route description information; matching the route contour in road network data to obtain the route matched with the route contour, so as to generate recommended routes, wherein this operation specifically includes: extracting intersection points in the route contour, each of which is formed by intersecting at least two lines; selecting one of the intersection points, and querying the road network data using a corresponding angle sequence of the selected intersection point in the route contour, so as to obtain intersections matched with the selected intersection point as candidate
(Continued)

intersections; traversing the candidate intersections, fixedly mapping the selected intersection point to the positions of the candidate intersections, equally scaling the route contour in the road network data, and recording mapped road information if all lines of the route contour are mapped onto connected roads; and generating the recommended routes with the recorded road information.

18 Claims, 11 Drawing Sheets

(51) Int. Cl.
    *G06T 7/13*     (2017.01)
    *G06F 16/29*     (2019.01)
    *G01C 21/20*     (2006.01)
    *G01C 21/34*     (2006.01)
    *G01C 21/36*     (2006.01)

(52) U.S. Cl.
    CPC ..... *G01C 21/3453* (2013.01); *G01C 21/3608* (2013.01); *G01C 21/3635* (2013.01); *G06F 16/29* (2019.01); *G06T 7/13* (2017.01); *G06T 7/181* (2017.01); *G06T 2207/10032* (2013.01); *G06T 2207/20096* (2013.01); *G06T 2207/30241* (2013.01)

(56) References Cited

U.S. PATENT DOCUMENTS

| | | | | |
|---|---|---|---|---|
| 2010/0217524 A1* | 8/2010 | Oohashi | ............... | G01C 21/30 701/472 |
| 2017/0276499 A1* | 9/2017 | Sun | ............... | G06Q 50/30 |
| 2019/0063926 A1* | 2/2019 | Xu | ............... | G01C 21/3469 |
| 2019/0355122 A1* | 11/2019 | Zhang | ............... | G06T 7/13 |
| 2020/0117943 A1* | 4/2020 | Xiong | ............... | G06V 20/62 |

FOREIGN PATENT DOCUMENTS

| | | | |
|---|---|---|---|
| CN | 102589557 A | | 7/2012 |
| CN | 102840866 A | | 12/2012 |
| CN | 103575267 A | | 2/2014 |
| CN | 106225794 A | | 12/2016 |
| CN | 107014391 A | | 8/2017 |
| CN | 107560611 A | | 1/2018 |
| CN | 108074009 A | | 5/2018 |
| CN | 108955706 A | | 12/2018 |
| CN | 109099903 A | | 12/2018 |
| CN | 109724617 A | | 7/2019 |
| CN | 110389992 A | | 10/2019 |
| CN | 110926486 A | | 3/2020 |
| EP | 2657865 A1 | | 10/2013 |
| EP | 3388785 A1 | | 10/2018 |
| JP | 5706634 B2 | * | 4/2015 |
| KR | 20040020993 A | | 3/2004 |
| KR | 20140111106 A | * | 9/2014 |
| KR | 20190044304 A | | 4/2019 |
| WO | 2017113367 A1 | | 7/2017 |

OTHER PUBLICATIONS

European Supplemental Search Report for Application No. EP20861991. 6, PCT/CN2020091420, dated Nov. 3, 2021, 10 pages.
Notice of Allowance for Application No. CN201911173279.2, dated Aug. 4, 2021, 5 pages.

* cited by examiner

METHOD AND APPARATUS FOR DETERMINING ROUTE, DEVICE AND COMPUTER STORAGE MEDIUM

This application is a national application and, pursuant to 35 U.S.C. § 371, is entitled to and claims the right of priority based on international application no. PCT/CN2020/091420, filed May 20, 2020, which claims priority to Chinese Patent Application No. 201911173279.2, entitled "Method and Apparatus for Determining Route, Device and Computer Storage Medium", filed on Nov. 26, 2019, all of which are incorporated by reference in their entirety.

FIELD OF THE DISCLOSURE

The present application relates to the technical field of computer applications, and particularly to a method and apparatus for determining a route, a device and a computer storage medium in the field of big data.

BACKGROUND OF THE DISCLOSURE

With the popularization of nationwide exercise, running as exercise with a threshold requirement which is relatively low gradually becomes a preferred way of public exercise. The popularization of various mobile positioning devices also aids users in clearly recording running tracks and routes, and facilitates sharing and spreading operations. In order to enhance the enjoyment of running, many runners desire to be able to run in personalized routes and keep records with the mobile positioning devices to create special, interesting or meaningful route shapes.

Currently, after the shapes of the personalized routes are completely outlined by the users, the routes are designed manually in conjunction with map road network data, and due to the complexity of the road network data, the way of manually designing the routes is quite difficult, time-consuming and labor-consuming.

SUMMARY OF THE DISCLOSURE

In view of this, the present application provides a method and apparatus for determining a route, a device and a computer storage medium, so as to reduce human and time costs of route design.

In a first aspect, the present application provides a method for determining a route, including:

acquiring route description information input by a user, and acquiring a route contour with the route description information;

matching the route contour in road network data to obtain the route matched with the route contour, so as to generate recommended routes, wherein this step specifically includes:

extracting intersection points in the route contour, each of which is formed by intersecting at least two lines;

selecting one of the intersection points, and querying the road network data using a corresponding angle sequence of the selected intersection point in the route contour, so as to obtain intersections matched with the selected intersection point as candidate intersections;

traversing the candidate intersections, fixedly mapping the selected intersection point to the positions of the candidate intersections, equally scaling the route contour in the road network data, and recording mapped road information if all lines of the route contour are mapped onto connected roads; and generating the recommended routes with the recorded road information.

According to a preferred implementation of the present application, the acquiring route description information input by a user and acquiring a route contour with the route description information includes:

acquiring a route contour track drawn by the user, and acquiring the route contour using the route contour track; or acquiring an image which is imported by the user and contains pattern data, and extracting a contour from the pattern data as the route contour; or acquiring a route description text input by the user, analyzing the route description text to obtain route shape information, searching an image containing pattern data using the route shape information, and extracting a contour from the pattern data as the route contour; or acquiring a route description sentence input by the user, analyzing the route description sentence to obtain route shape information, searching an image containing pattern data using the route shape information, and extracting a contour from the pattern data as the route contour.

According to a preferred implementation of the present application, the extracting a contour from the pattern data includes:

extracting contours of the pattern data from the searched image based on an edge detection algorithm;

clustering the contours based on feature points of the contours; and selecting one contour from a cluster obtained by the clustering operation as the route contour.

According to a preferred implementation of the present application, before the extracting a contour from the pattern data, the method further includes:

converting the searched images into binary images; and deleting the image containing more than one connected domain.

According to a preferred implementation of the present application, the extracting intersection points in the route contour includes:

converting the route contour into a broken line graph; and extracting end points and lines therebetween in the broken line graph, wherein the end points include the intersection points.

According to a preferred implementation of the present application, the method further includes:

pre-constructing an intersection database using the road network data, wherein the intersection database includes all angle sequences corresponding to intersections.

According to a preferred implementation of the present application, the pre-constructing an intersection database using the road network data includes:

for each intersection, extracting all combinations with the intersection as a road intersection point;

determining included angles formed between roads in each combination in sequence in a preset direction to form the angle sequence corresponding to the combination;

recording the angle sequences corresponding to all the combinations of the intersection; and establishing inverted indexes of the intersections with the angle sequences as keys, so as to construct the intersection database.

According to a preferred implementation of the present application, the corresponding angle sequence of the intersection point in the route contour is determined by:

determining included angles formed between the lines at the intersection point in the route contour in sequence in a preset direction, so as to form the angle sequence corresponding to the intersection point.

According to a preferred implementation of the present application, the selecting one of the intersection points includes:

querying the intersection database using the angle sequence corresponding to each intersection point, and determining the number of intersections hit by each intersection point; and selecting the intersection point which hits the smallest number of intersections.

According to a preferred implementation of the present application, the querying the road network data using a corresponding angle sequence of the selected intersection point in the route contour, so as to obtain intersections matched with the selected intersection point as candidate intersections includes:

querying the intersection database using the angle sequence corresponding to the selected intersection point, and taking the hit intersections as the candidate intersections respectively.

According to a preferred implementation of the present application, if the route description information does not contain route position information, the querying the road network data includes querying the road network data within a first distance range preset by the user; and if the route description information contains the route position information, the querying the road network data includes querying the road network data corresponding to a route position.

According to a preferred implementation of the present application, the recording a mapped road position if all lines of the route contour are mapped onto connected roads includes:

if all the end points of the route contour are mapped onto the road, determining whether all the lines of each route contour are connected on the road where all the end points are mapped, and if yes, recording the mapped road information; or, if the end points in the route contour which are mapped onto the road exceed a preset proportion, determining whether the end points which are not mapped onto the road have a road in a preset second distance range, and if yes, mapping the end points which are mapped onto the road onto the road in the preset second distance range; and determining whether all the lines of each route contour are connected on the road where the end points are mapped, and if yes, recording the mapped road information.

According to a preferred implementation of the present application, the route description information includes route length information;

in the process of equally scaling the route contour, if a road length corresponding to the mapped road information exceeds the requirement for the route length information, equal-proportion amplification is stopped, and the road information with the road length exceeding the requirement for the route length information is not recorded.

According to a preferred implementation of the present application, the method further includes:

providing a route recommendation interface for displaying the recommended routes.

According to a preferred implementation of the present application, the route recommendation interface includes a tab component for each recommended route, and the tab component displays attribute information of the corresponding route;

when one route tab is selected, the route corresponding to the selected route tab is displayed on a map interface.

According to a preferred implementation of the present application, the attribute information includes at least one of:

the route length information, distance information of the route from the user, and similarity information of the route to the route contour.

According to a preferred implementation of the present application, the route recommendation interface further includes:

a navigation component or a track recording component;

wherein the navigation component is displayed when the distance between the selected route and the user is greater than or equal to a preset first distance threshold, the track recording component is displayed when the distance between the selected route and the user is less than or equal to a preset second distance threshold, and the first distance threshold is greater than the second distance threshold;

the navigation component is configured to display navigation information from the position of the user to the selected route after triggered;

the track recording component is configured to record a route track of the user after triggered.

In a second aspect, the present application further provides an apparatus for determining a route, including:

a contour acquiring unit configured to acquire route description information input by a user, and acquire a route contour with the route description information; and a road network matching unit configured to match the route contour in road network data to obtain the route matched with the route contour, so as to generate recommended routes;

wherein the road network matching unit specifically includes:

an intersection-point extracting subunit configured to extract intersection points in the route contour, each of which is formed by intersecting at least two lines;

an intersection matching subunit configured to select one of the intersection points, and query the road network data using a corresponding angle sequence of the selected intersection point in the route contour, so as to obtain intersections matched with the selected intersection point as candidate intersections;

a road mapping subunit configured to traverse the candidate intersections, fixedly map the selected intersection point to the positions of the candidate intersections, equally scale the route contour in the road network data, and record mapped road information if all lines of the route contour are mapped onto connected roads; and a route generating subunit configured to generate the recommended routes with the recorded road information.

In a third aspect, the present application further provides an electronic device, including:

at least one processor; and a memory connected with the at least one processor communicatively;

wherein the memory stores instructions executable by the at least one processor to cause the at least one processor to perform the method as mentioned above.

In a fourth aspect, the present application further provides a non-transitory computer readable storage medium with computer instructions stored thereon, wherein the computer instructions are used for causing a computer to perform any of the methods as mentioned above.

From the above technical solution, the above-mentioned method and apparatus, the device as well as the computer storage medium according to the present application may have the following advantages.

1) Only by inputting the route description information, the user is able to perform a matching operation in the road network data to obtain the recommended routes matched with the required route contour in the specific route determining way according to the present application, and is not required to manually design the route in conjunction with the map road network data, which reduces the human and time costs of the route design.

2) In the present application, various ways of inputting the route description information are supported, including drawing a route contour track by the user, locally importing the image from a terminal device, and inputting the description of the required route by the user by means of a text or voice.

3) In the present application, the route contour may be acquired by means of a network search based on the description text or the description voice provided by the user, and therefore, various complex routes are possible.

4) In the present application, the intersection is first matched based on the angle sequence of the intersection point in the contour, the intersection point is mapped to the intersection, and then, the road matching operation is performed by the equal scaling operation, such that the road network matching efficiency is higher, and the route accuracy is higher.

5) In the present application, in addition to the matching operation of a specified route shape, further restrictions on the matched routes, such as the route position, the route length, or the like, are supported.

6) In the present application, the route recommendation interface is able to more clearly display the information of each route for the user to select, and the display of the navigation component or the track recording component on the interface is able to further meet navigation and track recording requirements of the user, thereby simplifying user operations and improving user experience.

Other effects of the above-mentioned alternatives will be described below in conjunction with embodiments.

BRIEF DESCRIPTION OF DRAWINGS

The drawings are used for better understanding the present solution and do not constitute a limitation of the present application. In the drawings.

DETAILED DESCRIPTION OF PREFERRED EMBODIMENTS

The following part will illustrate exemplary embodiments of the present application with reference to the figures, including various details of the embodiments of the present application for a better understanding. The embodiments should be regarded only as exemplary ones. Therefore, those skilled in the art should appreciate that various changes or modifications can be made with respect the embodiments described herein without departing from the scope and spirit of the present application. Similarly, for clarity and conciseness, the descriptions of the known functions and structures are omitted in the descriptions below.

Figure 1:
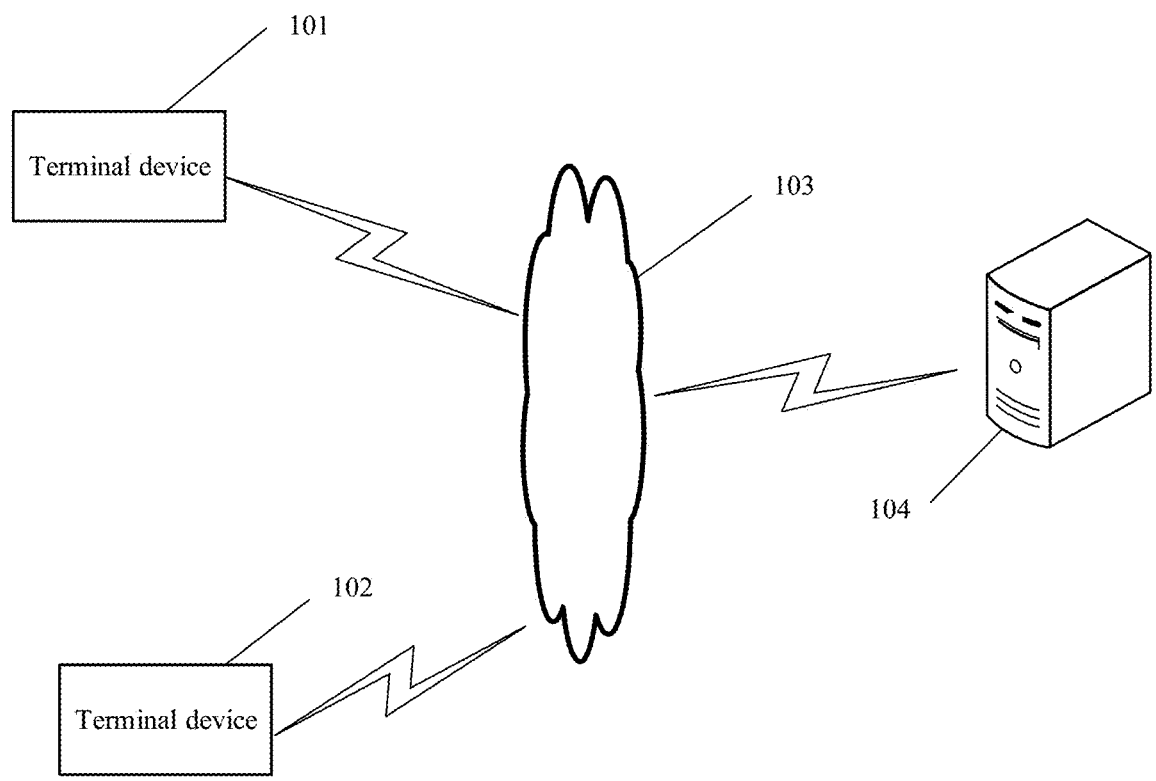
FIG. 1 is a diagram of an exemplary system architecture to which embodiments of the present application may be applied.

FIG. 1 shows an exemplary system architecture to which a method or apparatus for determining a route according to embodiments of the present application may be applied.

As shown in FIG. 1, the system architecture may include terminal devices 101, 102, a network 103 and a server 104. The network 103 serves as a medium for providing communication links between the terminal devices 101, 102 and the server 104. The network 103 may include various connection types, such as wired and wireless communication links, or fiber-optic cables, or the like.

Users may use the terminal devices 101, 102 to interact with the server 104 through the network 103. Various applications, such as a voice interaction application, a web browser application, a map application, a communication application, or the like, may be installed on the terminal devices 101, 102.

The terminal devices 101, 102 may be configured as various electronic devices, including, but not limited to, smart phones, tablets, smart wearable devices, or the like. The apparatus for determining a route according to the present invention may be provided and run in the above-mentioned server 104. The apparatus may be implemented as a plurality of pieces of software or a plurality of software modules (for example, for providing distributed service), or a single piece of software or a single software module, which is not specifically limited herein.

The terminal device 101 or 102 may send route description information input by the user to the server 104 through the network 103, and the server 104 executes the method for determining a route according to the present application, determines recommended routes, and then sends the recommended routes to the terminal device 101 or 102 through the network 103 for display. Road network data may be used when the server 104 determines the recommended routes, and may be maintained in the server 104 or a database independent from the server 104.

The server 104 may be configured as a single server or a server group including a plurality of servers. It should be understood that the numbers of the terminal devices, the network, and the server in FIG. 1 are merely schematic.

There may be any number of terminal devices, networks and servers as desired for an implementation.

Figure 2:
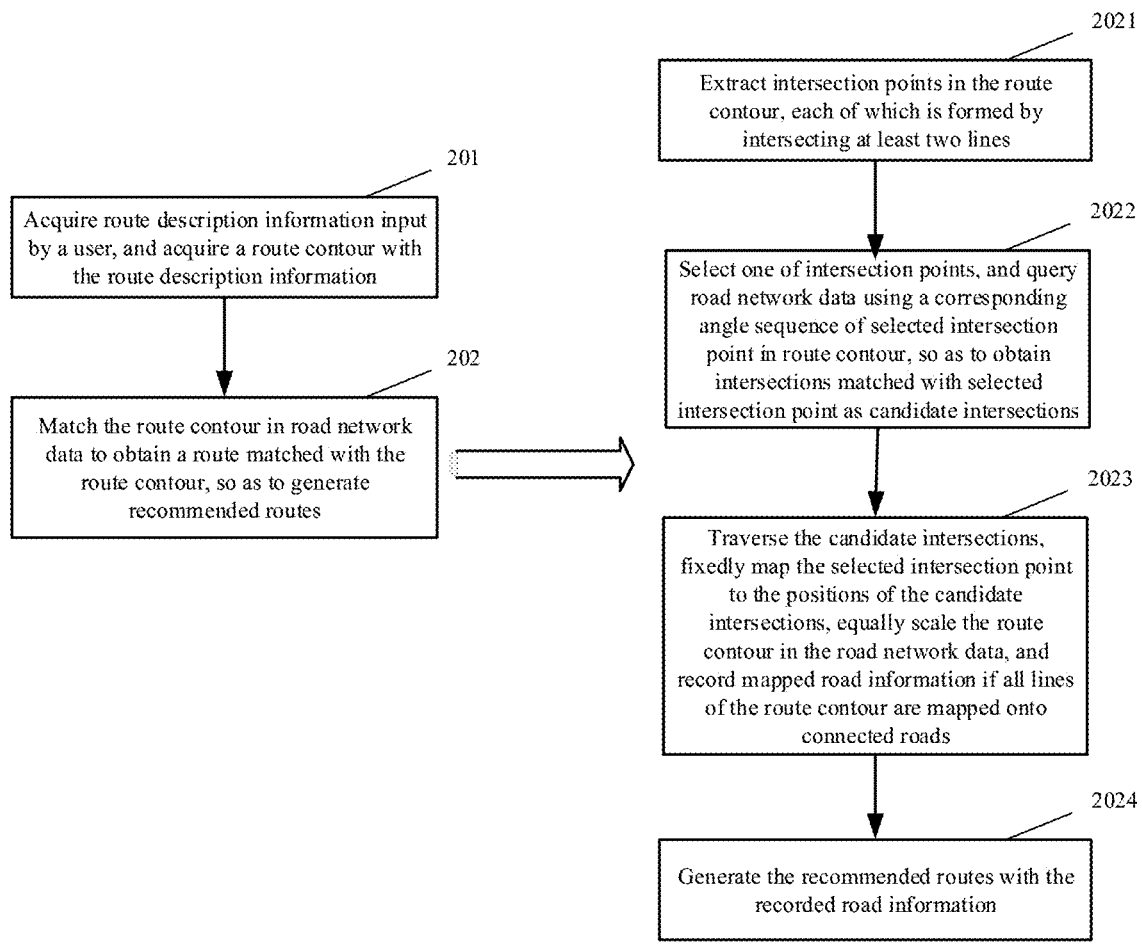
FIG. 2 is a flow chart of a main method according to an embodiment of the present application.

As shown in FIG. 2, a method according to the present application mainly includes: 201: acquiring route description information input by a user, and acquiring a route contour with the route description information.

This step may be implemented in various ways, for example, including, but not limited to:

First way: acquiring a route contour track drawn by the user, and acquiring the route contour using the route contour track. That is, the user may draw the route contour, for example, a heart-shaped route contour, on an interface of the terminal device, and the terminal device provides the route contour track drawn by the user for the server.

Second way: acquiring an image which is imported by the user and contains pattern data, and extracting a contour from the pattern data as the route contour. That is, the user may also import the image containing certain pattern data from the terminal device locally, the terminal device sends the image to the server, and the server extracts the contour from the pattern data as the route contour.

Third way: acquiring a route description text input by the user, analyzing the route description text to obtain route shape information, searching an image containing pattern data using the route shape information, and extracting a contour from the pattern data as the route contour.

The user may input the route description text on the terminal device, the route description text may be input by the user actively, and for example, the user inputs "run in a heart-shaped route with a length less than 1000 meters in Beijing".

The interface of the terminal device may also provide the user with options of various route description texts for the user to select or input. For example, the interface of the terminal device provides the user with options, such as "shape", "length", "position", or the like, the user selects a specific numerical value from the options, and for example, the user selects "heart-shaped" in the "shape" option, and "less than 1000 meters" in the length option, or manually inputs "less than 1000 meters", selects "Beijing" in the "position" option, or manually inputs or positions "Beijing".

Fourth way: acquiring a route description sentence input by the user, analyzing the route description sentence to obtain route shape information, searching an image containing pattern data using the route shape information, and extracting a contour from the pattern data as the route contour.

In this way, the user may input a voice in the terminal device by means of voice interaction, such as "I want to run in a heart-shaped running route with a length less than 1000 meters in Beijing". After voice recognition, a corresponding text is obtained, a natural language processing process is then performed, and the route shape information "heart-shaped", length information "less than 1000 meters" and running position information "Beijing" are recognized.

In the above-mentioned third and fourth ways, a network search is performed using the route shape information, the image containing the pattern data is obtained, and the contour is extracted therefrom as the route contour. Both ways are not limited to conventional route shapes, and may also meet demands for some complex route shapes. For example, a teddy-bear-shaped route in which the user wants to run may also be implemented. A detailed description will be given in an embodiment shown in FIG. 3.

202: matching the route contour in road network data to obtain the route matched with the route contour, so as to generate recommended routes.

The step 202 may specifically include:

in 2021, extracting intersection points in the route contour, each of which is formed by intersecting at least two lines;

in 2022, selecting one of the intersection points, and querying the road network data using a corresponding angle sequence of the selected intersection point in the route contour, so as to obtain intersections matched with the selected intersection point as candidate intersections;

in 2023, traversing the candidate intersections, fixedly mapping the selected intersection point to the positions of the candidate intersections, equally scaling the route contour in the road network data, and recording mapped road information if all lines of the route contour are mapped onto connected roads; and in 2024, generating the recommended routes with the recorded road information.

From the above-mentioned steps 2021-2024, it may be seen that in the route matching way in the present application, the intersection in the road network data is matched with the angle sequence corresponding to the intersection point from the intersection point in the route contour, such that the angle sequence of the intersection point is consistent with the angle sequence of the intersection. The angle sequence of the intersection point is formed by included angles between lines at the intersection point in sequence in a preset direction. The angle sequence of the intersection is formed by included angles of various road combinations at the intersection in sequence in a preset direction. Then, the intersection point is fixedly mapped to the matched intersection, an equal scaling operation is performed, and a mapping operation is performed to the road of the road network data until each line of the route outline is mapped to the connected roads.

In addition to the route shape information, other route description information may be incorporated in the matching and mapping processes, such as route position information and route length information, the matching operation is performed in the road network data corresponding to a route position according to the route position information, mapped routes are filtered according to the route length information, and only the road information meeting the route length information is recorded.

Figure 3:
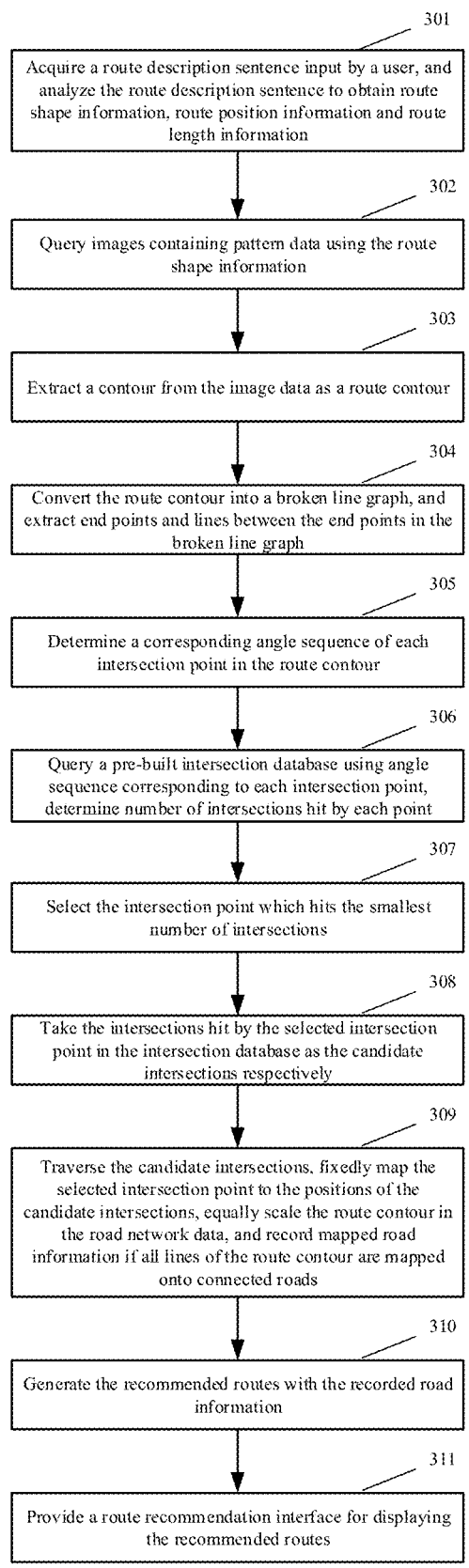
FIG. 3 is a detailed flow chart of a method according to an embodiment of the present application.

A method according to the present application will be described below in detail in conjunction with one embodiment. FIG. 3 is a detailed flow chart of a method according to an embodiment of the present application, and as shown in FIG. 3, the method may specifically include the following steps:

In 301, acquiring a route description sentence input by a user, and analyzing the route description sentence to obtain route shape information, route position information and route length information.

The user may input the route description sentence on a voice interaction interface of the terminal device, and then, a corresponding route description text is obtained after voice recognition is performed on the route description sentence. The route description text is analyzed in a natural language processing process to obtain route description information.

For example, the user inputs a voice "I want to run in a heart-shaped running route with a length less than 1000 meters in Beijing". After the voice recognition and the natural language processing process, the route shape information "heart-shaped", the length information "less than 1000 meters" and the running position information "Beijing" are obtained by analysis.

For example, the user inputs a voice "I want to find an inverted-m-shaped running route with a length less than 1 km in Beijing", and after the voice recognition and the natural language processing process, the route shape information "inverted-m-shaped", the route position information "Beijing" and and the route length information "less than 1 km" are obtained by analysis.

Specific ways of the voice recognition and the natural language processing process are not limited in the present application, and existing mature technologies may be adopted.

In 302, querying images containing pattern data using the route shape information.

A network search is performed using the analyzed route shape information, so as to acquire the images containing the corresponding pattern data. However, since images in the network have uneven quality and image subjects may not have desired shapes, the searched images are required to be further processed.

The searched images may be converted into binary images, that is, may be binarized. For the binary images, connected domains with area proportions in the images less than a preset proportion threshold are eliminated, and then, the image containing more than one connected domain is deleted, with the purpose of eliminating the image with more than one image subject, so as to avoid interference.

In 303, extracting a contour from the image data as a route contour.

In this step, contours of the pattern data may be extracted from the image obtained in the step 302 based on an edge detection algorithm. A mature edge detection algorithm, such as Canny, Sobel, or the like, may be adopted, and is not detailed in the embodiment of the present application.

In order to avoid some searched interference images, for example, the user desires to obtain a heart-shaped running route, but besides the image containing a heart-shaped pattern, images containing the word "heart shape" may also be found, and then are required to be filtered out. Therefore, the extracted contours may be further clustered based on feature points of the contours, and then, one contour is selected from a cluster obtained by the clustering operation as the route contour.

The feature points of the contour on which the clustering operation is based may be scale-invariant feature transform (SIFT). The SIFT is a description commonly used in the image processing field, which has scale invariance, key points may be detected in an image with the SIFT, and the SIFT is a local feature descriptor. Certainly, besides the SIFT, other types of feature points may be adopted.

After the clustering operation, one contour may be selected from the main cluster (a cluster with the largest number of images) obtained by the clustering operation as the route contour. Any one contour or the contour closest to the clustering center may be selected as the route contour, and other selection ways may also be adopted.

In 304, converting the route contour into a broken line graph, and extracting end points and lines between the end points in the broken line graph.

When the route contour is converted into the broken line graph, points may be extracted from the route contour in a certain density and sequentially connected into line segments; then, each point is connected with the point spaced by one point into a new line segment, and if the distance between the new line segment obtained by connection and the spacing point is less than a preset threshold, the spacing point and the line segments thereof are merged into the new line segment; recursion is performed in this way until the merging operation is unable to be performed, and the broken line graph is obtained. Other existing broken-line-graph conversion ways than this way may also be adopted.

Figure 4:
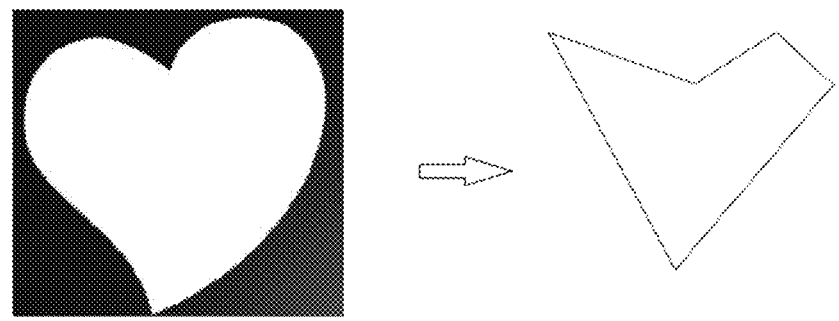
FIG. 4 is a diagram of an example of extracting a broken line graph according to an embodiment of the present application.

For example, as shown in FIG. 4, a heart-shaped image on the left is subjected to contour extraction and conversion to obtain the broken line graph shown on the right.

Then, the end points and the lines between the end points in the broken line graph are extracted. The end points may include vertexes and intersection points.

Figure 5A:
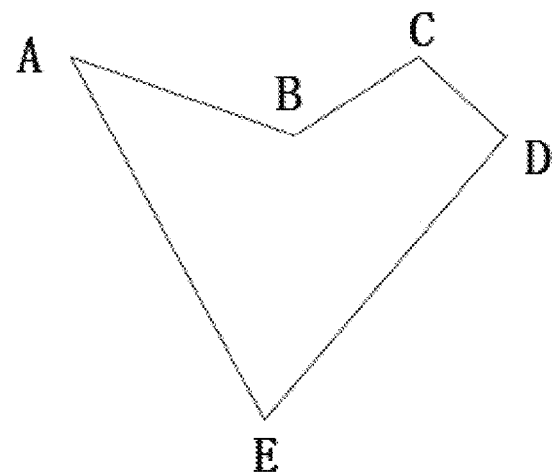
FIGS. 5a and 5b are two broken line graphs according to an embodiment of the present application.

In the broken line graph with a heart-shaped contour in FIG. 5a, the end points include A, B, C, D and E which are also intersection points. The lines between A and B, B and C, C and D, D and E as well as E and A are determined.

Figure 5B:
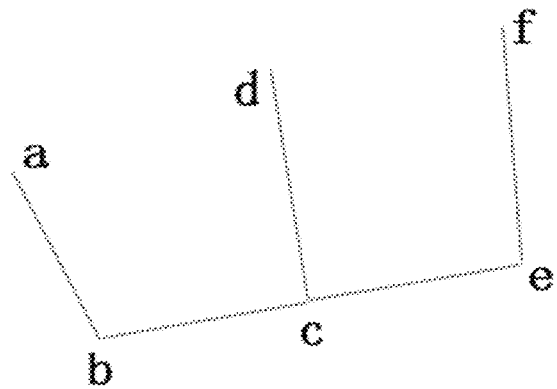

In the broken line graph with an inverted-m-shaped contour in FIG. 5b, the end points include a, b, c, d, e and f, wherein b, c and e are intersection points. The lines between a and b, b and c, c and d, c and e as well as e and f are determined.

In 305, determining a corresponding angle sequence of each intersection point in the route contour.

In this embodiment, included angles formed between the lines at the intersection point in the route contour in sequence in a preset direction may be determined, so as to form the angle sequence corresponding to the intersection point. The preset direction may be a counterclockwise direction or a clockwise direction, but is only able to be one fixed direction.

For example, for the intersection point b in FIG. 5b, the included angle between the line ab and the line ac is 85 degrees, and the included angle between cb and ba is 275 degrees, such that the angle sequence of the intersection point b may be represented as 85-275.

For the intersection point c, the included angle between the lines bc and cd is 95 degrees, the included angle between the lines dc and ce is 90 degrees, and the included angle between the lines ec and cd is 175 degrees, such that the angle sequence of the intersection point c may be represented as 95-90-175.

Similarly, the angle sequence of the intersection point e may be represented as 95-265.

In 306, querying a pre-built intersection database using the angle sequence corresponding to each intersection point, and determining the number of intersections hit by each intersection point.

Figure 6:
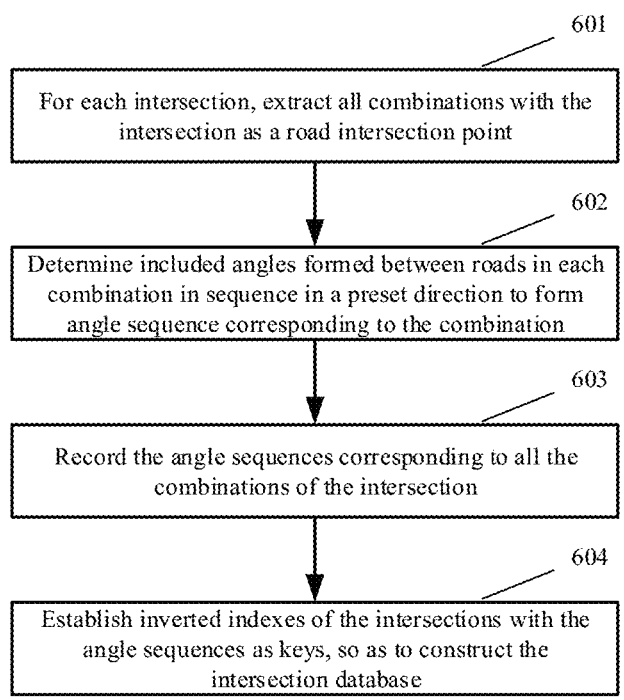
FIG. 6 is a flow chart of a method for building an intersection database according to an embodiment of the present application.

For the convenience of understanding the present embodiment, a process of pre-building the intersection database will be described first. The intersection database includes all angle sequences corresponding to the intersections in the road network data. As shown in FIG. 6, the building process may include:

In 601, for each intersection, extracting all combinations with the intersection as a road intersection point.

Figure 7A:
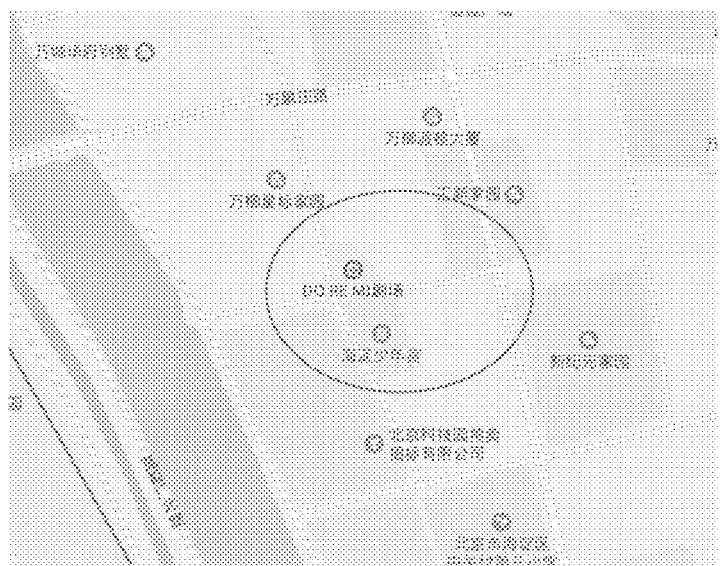
FIGS. 7a and 7b are schematic diagrams of an intersection and road combinations corresponding to the intersection according to an embodiment of the present application respectively.
Figure 7B:
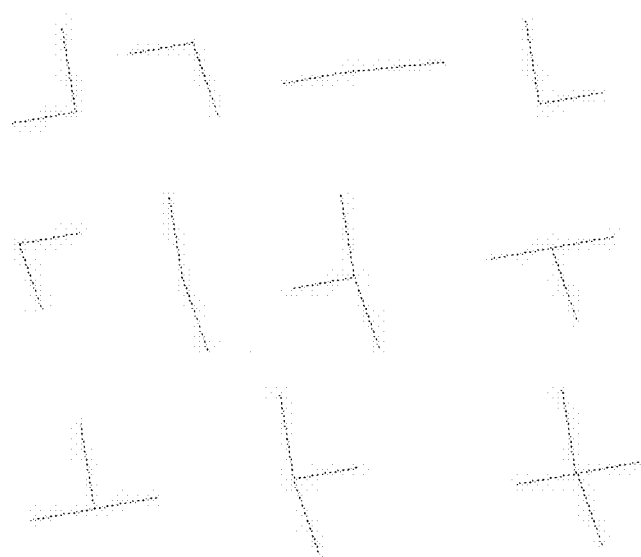

Road information is contained in the road network data, and the intersection must be formed by intersecting roads. For example, the intersection circled in FIG. 7a is formed by intersecting four roads. Then, after all the roads are combined, 11 combinations as shown in FIG. 7b are obtained.

In 602, determining included angles formed between roads in each combination in sequence in a preset direction to form the angle sequence corresponding to the combination.

Figure 7C:
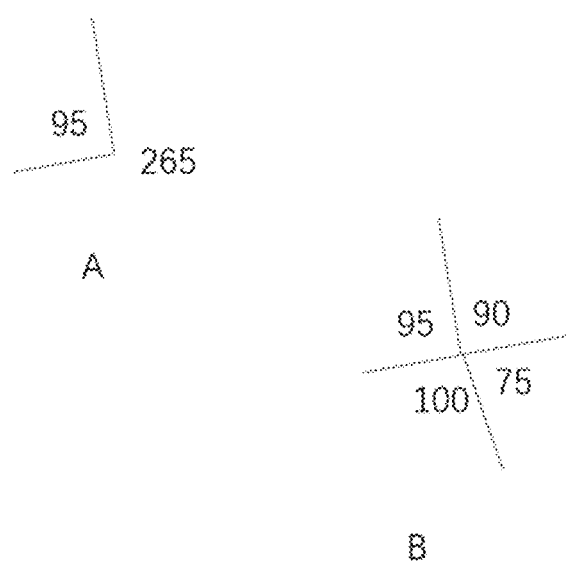
FIG. 7c is a schematic angle diagram of two combinations in FIG. 7b.

In this step, all the possible angle sequences of each combination are determined. For example, in FIG. 7c, all the angle sequences of the combination A may be:

95-265

265-95 and all the angle sequences of the combination B may be:
95-90-75-100
100-95-90-75
75-100-95-90
90-75-100-95

In the process of building the intersection database, the angles in the angle sequences of each above-mentioned combination may be generalized, and for example, 75 degrees may be generalized within a certain range into 74 degrees, 75 degrees and 76 degrees, thereby improving a recall rate.

In 603, recording the angle sequences corresponding to all the combinations of the intersection.

The angle sequences corresponding to all the combinations are recorded as the angle sequences corresponding to the intersection.

In 604, establishing inverted indexes of the intersections with the angle sequences as keys, so as to construct the intersection database.

After recorded, the angle sequences corresponding to all the intersections may be used as the keys to establish the inverted indexes of the intersections. Assuming that the intersections B, X, Y, or the like, all correspond to the angle sequence 75-100-95-90, the angle sequence may hit the intersections B, X, Y, or the like.

With continued reference to the step 306 in FIG. 3, the intersection database is queried for the angle sequences corresponding to each intersection point, and each intersection point may hit a series of intersections. It should be noted herein that when the intersection database is queried, the route position information may be further used for assistance. If the route description information input by the user contains the route position information, the road network data corresponding to the route position information, i.e., the intersection database corresponding to the route position information, is queried. For example, if desiring to obtain a running route in Beijing, the user may query an intersection database corresponding to Beijing. If the route description information input by the user does not contain the route position information, road network data corresponding to the current position of the user, i.e., road network data within a preset first distance range from the user, for example, a corresponding intersection database within 1 km from the user is queried.

In 307, selecting the intersection point which hits the smallest number of intersections.

Assuming that in FIG. 5b, the intersection point b hits 1000 intersections, the intersection point c hits 100 intersections, and the intersection point e hits 800 intersections, the intersection point c is selected.

In 308, taking the intersections hit by the selected intersection point in the intersection database as the candidate intersections respectively.

Continuing with the above example, subsequent steps are executed with the 100 intersections hit by the intersection c as the candidate intersections respectively.

In 309, traversing the candidate intersections, fixedly mapping the selected intersection point to the positions of the candidate intersections, equally scaling the route contour in the road network data, and recording mapped road information if all lines of the route contour are mapped onto connected roads.

Figure 8:
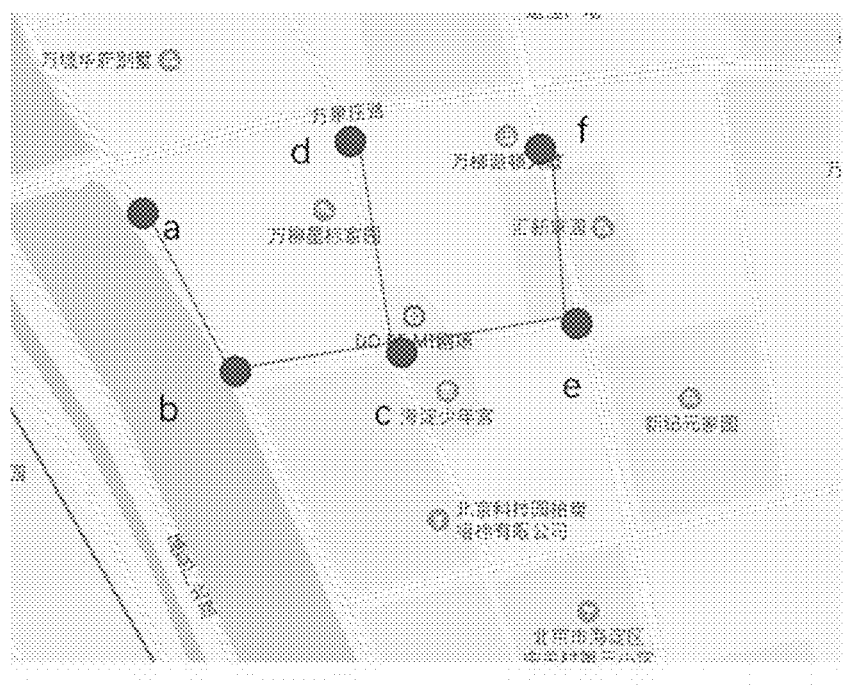
FIG. 8 is a schematic diagram in which a route contour is mapped onto a road according to an embodiment of the present application.

Assuming that the intersection shown in FIG. 7a is one of the candidate intersections of the intersection c in FIG. 5b, the intersection c may be fixedly mapped to the intersection, and then, the route contour is scaled equally. That is, the distance from each point on the route contour to the point c is scaled equally. If the lines of the route contour, i.e., the lines ab, bc, cd, ce, ef, are all mapped to the connected roads, as shown in FIG. 8, the currently-mapped road information is recorded.

Specifically, in the equal scaling process, if all the end points of the route contour are mapped onto the road, whether all the lines of each route contour are connected on the road where all the end points are mapped is determined, and if yes, the mapped road information is recorded.

Further, some fault tolerance mechanisms may be allowed in the equal scaling process to improve the recall rate of the road, and therefore, if the end points in the route contour which are mapped onto the road exceed a preset proportion, whether the end points which are not mapped onto the road have a road in a preset second distance range is determined, and if yes, the end points which are mapped onto the road are mapped onto the road in the preset second distance range; and whether all the lines of each route contour are connected on the road where the end points are mapped is determined, and if yes, the mapped road information is recorded. For example, if in 8 end points in a certain route contour, 7 end points may be mapped onto a road at a certain position, only 1 end point is not mapped onto the road, but there is a road 5 meters away from the end point, the remaining 1 point may be mapped onto the road nearby, such that the influence on the shape of the whole route is small.

In addition, when the route contour is subjected to equal proportion amplification, if in the amplification process, a road length corresponding to the mapped road information exceeds the requirement of the user for the route length information, equal-proportion amplification is stopped, and the road information with the road length exceeding the requirement for the route length information is not recorded.

The mapped road information recorded in this step refers to a route constituted by road portions to which the route contour is mapped.

In 310, generating the recommended routes with the recorded road information.

In this step, routes corresponding to the recorded road information may be sorted according to a certain rule, for example, the distance between the route and the user, the route length, the similarity between the route and the route contour, or the like. Then, the first M routes are selected as the recommended routes, wherein M is a preset positive integer.

In 311, providing a route recommendation interface for displaying the recommended routes.

The server may send data of the route recommendation interface to a client of the terminal device, the terminal device displays the route recommendation interface to the user, and the recommended routes are displayed in the route recommendation interface.

Figure 9A:
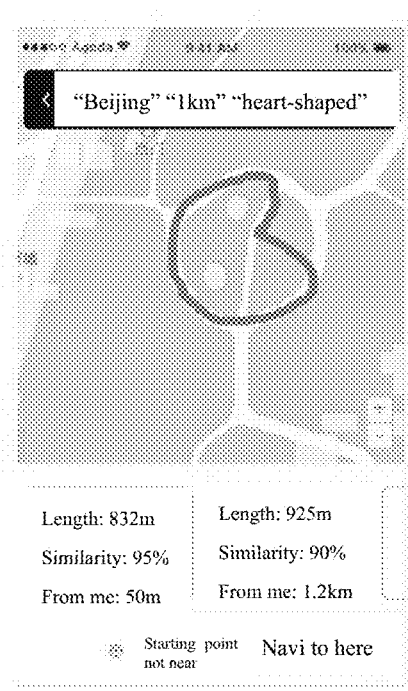
FIGS. 9a and 9b are schematic diagrams of a route recommendation interface according to an embodiment of the present application.
Figure 9B:
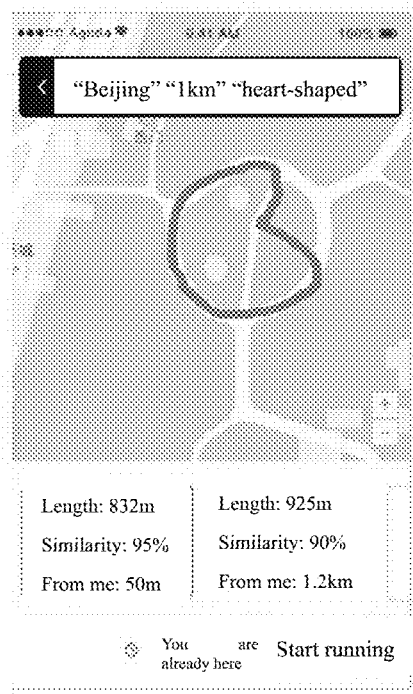

The way of displaying the recommended routes in the route recommendation interface may be set flexibly. A preferred implementation is listed here. A tab component for each recommended route may be displayed on the route recommendation interface, and for example, M recommended routes correspond to M tab components. As shown in FIGS. 9a and 9b, each tab component shows attribute information of the corresponding route, for example, the route length information, distance information of the route from the user, similarity information of the route to the route contour, or the like. When one route tab is selected, the route corresponding to the selected route tab is displayed on a map interface. During initial display of the route recommendation interface, the first route tab may be selected by default.

The similarity between the route and the route contour may be calculated based on features, such as SIFT feature points, image moments, or the like.

In addition, the route recommendation interface may further include a navigation component or a track recording component. The navigation component is displayed when the distance between the selected route and the user is greater than or equal to a preset first distance threshold. As shown in FIG. 9a, the component identified by "Navi to here" is the navigation component configured to display navigation information from the position of the user to the selected route after triggered. For example, the route tab currently selected by the user is a route 1.2 km away from the user. Then, the user may click on the component identified by "Navi to here" to begin navigation from the position of the user to the selected route. Obviously, due to the arrangement of the navigation component, it is avoided that when far away from the recommended route, the user is required to exit the route recommendation interface and return to the map interface to search for the place of the route for navigation, the navigation from the position of the user to the recommended route may be directly performed through the route recommendation interface, thus simplifying user operations, and improving user experience.

The track recording component is displayed when the distance between the selected route and the user is less than or equal to a preset second distance threshold, and the first distance threshold is greater than the second distance threshold. As shown in FIG. 9b, the component identified by "Start running" is the track recording component configured to record a route track of the user after triggered. For example, if currently selecting a route 50 meters away from the user, the user may click on the component identified by "Start running" to start running, and the server starts recording the route track of the user using locating information of the terminal device.

After the user runs, the recorded route track of the user may be generated into a sharing interface for the user to share. Attribute information of the route and information, such as the similarity between the recorded route track and the route outline of the user, or the like, may be displayed on the sharing interface.

The method according to the present application is described above in detail, and an apparatus according to the present application will be described below in detail in conjunction with an embodiment.

Figure 10:
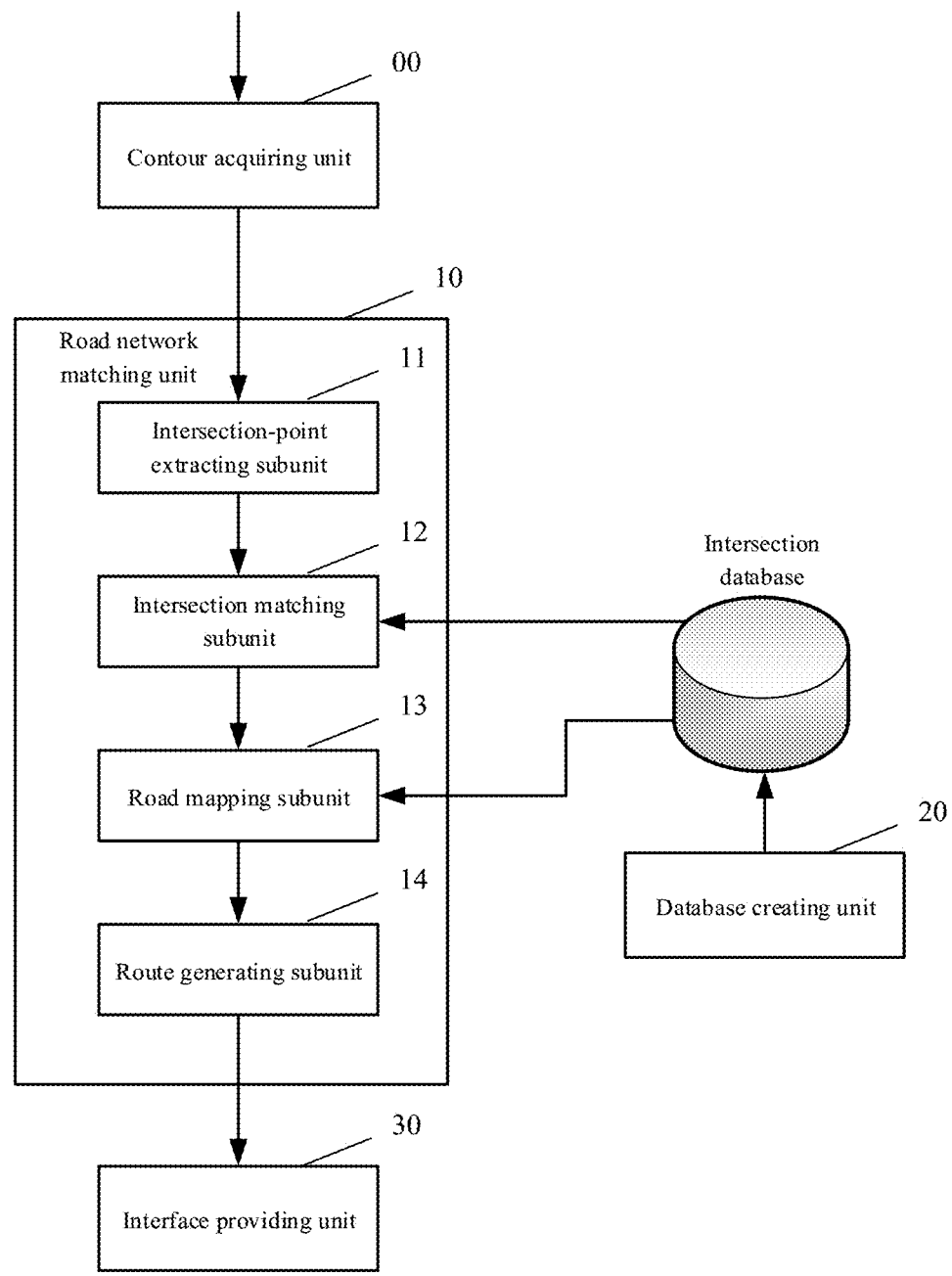
FIG. 10 is a schematic diagram of an apparatus for determining a route according to an embodiment of the present application.

FIG. 10 is a schematic diagram of an apparatus for determining a route according to an embodiment of the present application, and as shown in FIG. 10, the apparatus may include a contour acquiring unit 00, a road network matching unit 10, a database creating unit 20 and an interface providing unit 30. The main functions of each constitutional unit are as follows.

The contour acquiring unit 00 is responsible for acquiring route description information input by a user, and acquiring a route contour with the route description information.

Specifically, the contour acquiring unit 00 may adopt, but not limited to, the following ways:

First way: acquiring a route contour track drawn by the user, and acquiring the route contour using the route contour track;

Second way: acquiring an image which is imported by the user and contains pattern data, and extracting a contour from the pattern data as the route contour;

Third way: acquiring a route description text input by the user, analyzing the route description text to obtain route shape information, searching an image containing pattern data using the route shape information, and extracting a contour from the pattern data as the route contour; and Fourth way: acquiring a route description sentence input by the user, analyzing the route description sentence to obtain route shape information, searching an image containing pattern data using the route shape information, and extracting a contour from the pattern data as the route contour.

When extracting the contour from the pattern data, the contour acquiring unit 00 may perform specific operations of:

extracting contours of the pattern data from the searched image based on an edge detection algorithm, wherein a mature edge detection algorithm, such as Canny, Sobel, or the like, may be adopted;

clustering the contours based on feature points of the contours, wherein the feature points of the contours on which the clustering operation is based may be SIFT; and selecting one contour from a cluster obtained by the clustering operation as the route contour.

Further, before extracting the contour from the pattern data, the contour acquiring unit 00 may convert the searched images into binary images and delete the image containing more than one connected domains, with the purpose of eliminating the image with more than one image subject, so as to avoid interference.

The road network matching unit 10 is responsible for matching the route contour in road network data to obtain the route matched with the route contour, so as to generate recommended routes.

If the route description information does not contain route position information, when querying the road network data, the road network matching unit 10 specifically queries the road network data within a first distance range preset by the user. If the route description information contains the route position information, when querying the road network data, the road network matching unit 10 specifically queries the road network data corresponding to a route position.

The road network matching unit 10 may specifically include an intersection-point extracting subunit 11, an intersection matching subunit 12, a road mapping subunit 13 and a route generating subunit 14.

The intersection-point extracting subunit 11 is responsible for extracting intersection points in the route contour, each of which is formed by intersecting at least two lines. Specifically, the intersection-point extracting subunit 11 may first convert the route contour into a broken line graph, and then extract end points and lines between the end points in the broken line graph, and the end points include the intersection points.

When the route contour is converted into the broken line graph, points may be extracted from the route contour in a certain density and sequentially connected into line segments; then, each point is connected with the point spaced by one point into a new line segment, and if the distance between the new line segment obtained by connection and the spacing point is less than a preset threshold, the spacing point and the line segments thereof are merged into the new line segment; recursion is performed in this way until the merging operation is unable to be performed, and the broken line graph is obtained. Other existing broken-line-graph conversion ways than this way may also be adopted.

To assist understanding, the database creating unit 20 is first described and configured to pre-construct an intersection database using the road network data, which specifically includes:

for each intersection, extracting all combinations with the intersection as a road intersection point;

determining included angles formed between roads in each combination in sequence in a preset direction to form the angle sequence corresponding to the combination;

recording the angle sequences corresponding to all the combinations of the intersection; and establishing inverted indexes with the angle sequences as keys and the intersections as values, so as to construct the intersection database.

The intersection matching subunit 12 is responsible for selecting one of the intersection points, and querying the road network data using a corresponding angle sequence of the selected intersection point in the route contour, so as to obtain intersections matched with the selected intersection point as candidate intersections.

When selecting one of the intersection points, the intersection matching subunit 12 may query the intersection database using the angle sequence corresponding to each intersection point, so as to determine the number of the intersections hit by each intersection point; and select the intersection point which hits the smallest number of intersections.

When the angle sequence of each intersection point in the route contour is determined, included angles formed between the lines at the intersection point in the route contour in sequence in a preset direction may be determined, so as to form the angle sequence corresponding to the intersection point.

The road mapping subunit 13 is responsible for traversing the candidate intersections, fixedly mapping the selected intersection point to the positions of the candidate intersections, equally scaling the route contour in the road network data, and recording mapped road information if all lines of the route contour are mapped onto connected roads.

If all the end points of the route contour are mapped onto the road, determining whether all the lines of each route contour are connected on the road where all the end points are mapped, and if yes, recording the mapped road information.

As a preferred implementation, if the end points in the route contour which are mapped onto the road exceed a preset proportion, determining whether the end points which are not mapped onto the road have a road in a preset second distance range, and if yes, mapping the end points which are mapped onto the road onto the road in the preset second distance range; and determining whether all the lines of each route contour are communicated on the road where the end points are mapped, and if yes, recording the mapped road information. This way actually allows some fault tolerance mechanisms to improve the recall rate of the road.

The route description information may further include route length information. In the process of equally scaling the route contour, if a road length corresponding to the mapped road information exceeds the requirement for the route length information, the road mapping subunit 13 stops equal-proportion amplification, and does not record the road information with the road length exceeding the requirement for the route length information.

The route generating subunit 14 is responsible for generating the recommended routes with the recorded road information. Routes corresponding to the recorded road information may be sorted according to a certain rule, for example, the distance between the route and the user, the route length, the similarity between the route and the route contour, or the like. Then, the first M routes are selected as the recommended routes, wherein M is a preset positive integer.

The interface providing unit 30 is responsible for providing a route recommendation interface for displaying the recommended routes.

The route recommendation interface may include a tab component for each recommended route, and the tab component displays attribute information of the corresponding route. When one route tab is selected, the route corresponding to the selected route tab is displayed on a map interface.

The above-mentioned attribute information may include at least one of: the route length information, distance information of the route from the user, and similarity information of the route to the route contour.

Further, the above-mentioned route recommendation interface may further include a navigation component or a track recording component. The navigation component is displayed when the distance between the selected route and the user is greater than or equal to a preset first distance threshold. The track recording component is displayed when the distance between the selected route and the user is less than or equal to a preset second distance threshold, and the first distance threshold is greater than the second distance threshold.

The navigation component is configured to display navigation information from the position of the user to the selected route after triggered. The track recording component is configured to record a route track of the user after triggered.

In addition, it should be noted that the above-mentioned method and apparatus according to the embodiments of the present application are not limited to determining the running route, and may also be used for determining a driving route, a riding route, or the like. The difference is only selection of the road network data, and when the running route is determined and recommended, the road network data corresponding to running is utilized, contains road information suitable for running, and does not contain road information not suitable for running, such as highways, or the like. When the driving route is recommended, the road network data corresponding to driving is utilized, contains road information suitable for driving, and does not contain some roads on which motor vehicles are not allowed to travel, roads in a residential quarter, or the like.

According to the embodiments of the present application, there are also provided an electronic device and a readable storage medium.

Figure 11:
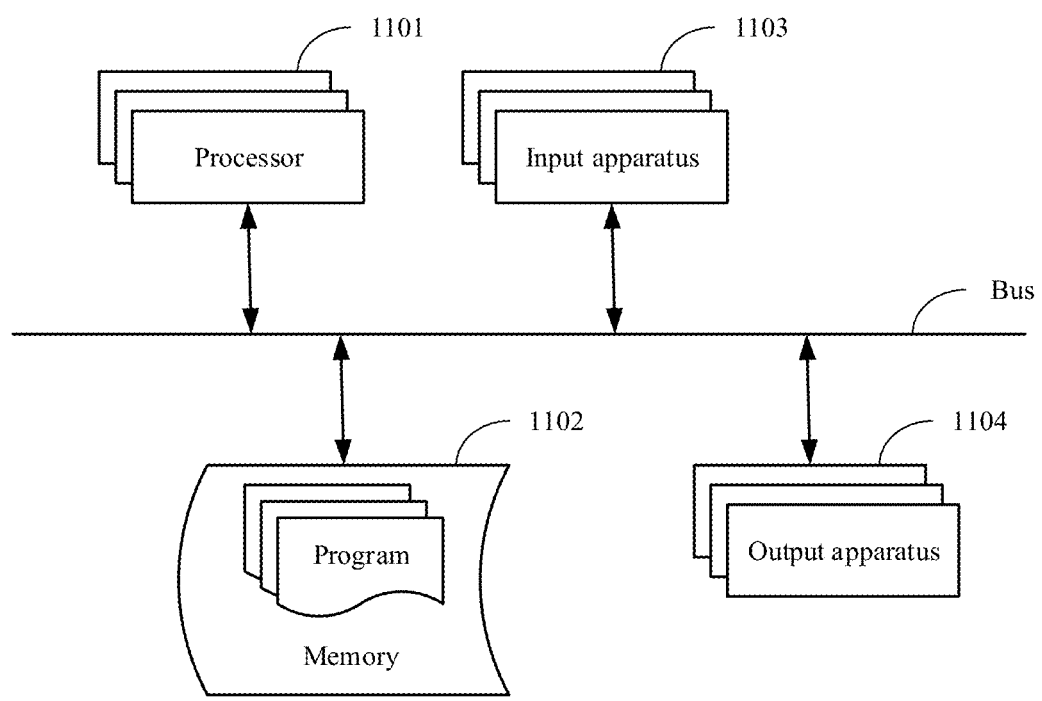
FIG. 11 is a block diagram of an electronic device configured to implement the method for determining a route according to the embodiments of the present application.

FIG. 11 is a block diagram of an electronic device for the method for determining a route according to the embodiment of the present application. The electronic device is intended to represent various forms of digital computers, such as laptop computers, desktop computers, workstations, personal digital assistants, servers, blade servers, mainframe computers, and other appropriate computers. The electronic device may also represent various forms of mobile apparatuses, such as personal digital processors, cellular telephones, smart phones, wearable devices, and other similar computing apparatuses. The components shown herein, their connections and relationships, and their functions, are meant to be exemplary only, and are not meant to limit implementation of the present application described and/or claimed herein.

As shown in FIG. 11, the electronic device includes one or more processors 1101, a memory 1102, and interfaces configured to connect the various components, including high-speed interfaces and low-speed interfaces. The various components are interconnected using different buses and may be mounted at a common motherboard or in other manners as desired. The processor may process instructions for execution within the electronic device, including instructions stored in or at the memory to display graphical information for a GUI at an external input/output apparatus, such as a display device coupled to the interface. In other implementations, plural processors and/or plural buses may be used with plural memories, if desired. Also, plural electronic devices may be connected, with each device providing some of necessary operations (for example, as a server array, a group of blade servers, or a multi-processor system). In FIG. 11, one processor 1101 is taken as an example.

The memory 1102 is configured as the non-transitory computer readable storage medium according to the present application. The memory stores instructions executable by the at least one processor to cause the at least one processor to perform a method for determining a route according to the present application. The non-transitory computer readable storage medium according to the present application stores computer instructions for causing a computer to perform the method for determining a route according to the present application.

The memory 1102 which is a non-transitory computer readable storage medium may be configured to store non-transitory software programs, non-transitory computer executable programs and modules, such as program instructions/modules corresponding to the method for determining a route according to the embodiments of the present application. The processor 1101 executes various functional applications and data processing of a server, that is, implements the method for determining a route according to the above-mentioned embodiments, by running the non-transitory software programs, instructions, and modules stored in the memory 1102.

The memory 1102 may include a program storage area and a data storage area, wherein the program storage area may store an operating system and an application program required for at least one function; the data storage area may store data created according to use of the electronic device, or the like. Furthermore, the memory 1102 may include a high-speed random access memory, or a non-transitory memory, such as at least one magnetic disk storage device, a flash memory device, or other non-transitory solid state storage devices. In some embodiments, optionally, the memory 1102 may include memories remote from the processor 1101, and such remote memories may be connected to the electronic device via a network. Examples of such a network include, but are not limited to, the Internet, intranets, local area networks, mobile communication networks, and combinations thereof.

The electronic device for the method for determining a route may further include an input apparatus 1103 and an output apparatus 1104. The processor 1101, the memory 1102, the input apparatus 1103 and the output apparatus 1104 may be connected by a bus or other means, and FIG. 11 takes the connection by a bus as an example.

The input apparatus 1103 may receive input numeric or character information and generate key signal input related to user settings and function control of the electronic device, such as a touch screen, a keypad, a mouse, a track pad, a touch pad, a pointing stick, one or more mouse buttons, a trackball, a joystick, or the like. The output apparatus 1104 may include a display device, an auxiliary lighting apparatus (for example, an LED) and a tactile feedback apparatus (for example, a vibrating motor), or the like. The display device may include, but is not limited to, a liquid crystal display (LCD), a light emitting diode (LED) display, and a plasma display. In some implementations, the display device may be a touch screen.

Various implementations of the systems and technologies described here may be implemented in digital electronic circuitry, integrated circuitry, ASICs (application specific integrated circuits), computer hardware, firmware, software, and/or combinations thereof. These various implementations may be implemented in one or more computer programs which are executable and/or interpretable on a programmable system including at least one programmable processor, and the programmable processor may be special or general, and may receive data and instructions from, and transmitting data and instructions to, a storage system, at least one input apparatus, and at least one output apparatus.

These computer programs (also known as programs, software, software applications, or codes) include machine instructions for a programmable processor, and may be implemented using high-level procedural and/or object-oriented programming languages, and/or assembly/machine languages. As used herein, the terms "machine readable medium" and "computer readable medium" refer to any computer program product, device and/or apparatus (for example, magnetic discs, optical disks, memories, programmable logic devices (PLDs)) for providing machine instructions and/or data to a programmable processor, including a machine readable medium which receives machine instructions as a machine readable signal. The term "machine readable signal" refers to any signal for providing machine instructions and/or data to a programmable processor.

To provide interaction with a user, the systems and technologies described here may be implemented on a computer having: a display apparatus (for example, a CRT (cathode ray tube) or LCD (liquid crystal display) monitor) for displaying information to a user; and a keyboard and a pointing apparatus (for example, a mouse or a trackball) by which a user may provide input to the computer. Other kinds of apparatuses may also be used to provide interaction with a user; for example, feedback provided to a user may be any form of sensory feedback (for example, visual feedback, auditory feedback, or tactile feedback); and input from a user may be received in any form (including acoustic, voice or tactile input).

The systems and technologies described here may be implemented in a computing system (for example, as a data server) which includes a back-end component, or a computing system (for example, an application server) which includes a middleware component, or a computing system (for example, a user computer having a graphical user interface or a web browser through which a user may interact with an implementation of the systems and technologies described here) which includes a front-end component, or a computing system which includes any combination of such back-end, middleware, or front-end components. The components of the system may be interconnected through any form or medium of digital data communication (for example, a communication network). Examples of the communication network include: a local area network (LAN), a wide area network (WAN) and the Internet.

A computer system may include a client and a server. Generally, the client and the server are remote from each other and interact through the communication network. The relationship between the client and the server is generated by virtue of computer programs which are run on respective computers and have a client-server relationship to each other.

The above-mentioned method and apparatus, the device as well as the computer storage medium according to the present application may have the following advantages.

1) Only by inputting the route description information, the user is able to perform a matching operation in the road network data to obtain the recommended routes matched with the required route contour in the specific route determining way according to the present application, and is not required to manually design the route in conjunction with the map road network data, which reduces the human and time costs of the route design.

2) In the present application, various ways of inputting the route description information are supported, including drawing a route contour track by the user, locally importing the image from a terminal device, and inputting the description of the required route by the user by means of a text or voice.

3) In the present application, the route contour may be acquired by means of a network search based on the description text or the description voice provided by the user, and therefore, various complex routes are possible.

4) In the present application, the intersection is first matched based on the angle sequence of the intersection point in the contour, the intersection point is mapped to the intersection, and then, the road matching operation is performed by the equal scaling operation, such that the road network matching efficiency is higher, and the route accuracy is higher.

5) In the present application, in addition to the matching operation of a specified route shape, further restrictions on the matched routes, such as the route position, the route length, or the like, are supported.

6) In the present application, the route recommendation interface is able to more clearly display the information of each route for the user to select, and the display of the navigation component or the track recording component on the interface is able to further meet navigation and track recording requirements of the user, thereby simplifying user operations and improving user experience.

It should be understood that various forms of the flows shown above may be used and reordered, and steps may be added or deleted. For example, the steps described in the present application may be executed in parallel, sequentially, or in different orders, and are not limited herein as long as the desired results of the technical solution disclosed in the present application may be achieved.

The above-mentioned embodiments are not intended to limit the scope of the present application. It should be understood by those skilled in the art that various modifications, combinations, sub-combinations and substitutions may be made, depending on design requirements and other factors. Any modification, equivalent substitution and improvement made within the spirit and principle of the present application all should be included in the extent of protection of the present application.

What is claimed is:

1. A computer-implemented method for determining a route to be presented to a user by a terminal device, comprising:
    acquiring route description information input by a user to extract a route broken line graph with the route description information;
    matching the route broken line graph in road network data to obtain the route matched with the route broken line graph, so as to generate recommended routes, wherein this step specifically comprises:
    extracting intersecting points in the route broken line graph, each of which is formed by intersecting at least two lines;
    selecting one of the intersecting points, and querying the road network data using a corresponding angle sequence of the selected intersecting point in the route broken line graph, an angle sequence of the intersecting point being formed by included angles between lines at the intersecting point in sequence in a counterclockwise direction or in a clockwise direction, and recording the angle sequences corresponding to all the combinations of the corners, so as to obtain corners matched with the selected intersecting point with a certain tolerance as candidate corners;
    traversing the candidate corners, matching the intersection in the road network data with the angle sequence corresponding to the intersection point from the intersection point in the route contour, such that the angle sequence of the intersection point is consistent with the angle sequence of the intersection, and fixedly mapping the selected intersecting point to the positions of the candidate corners, equally scaling the route broken line graph in the road network data, and if all end points of the route contour are mapped onto the road and all lines of each route broken line graph are connected on the road where all the end points are mapped with a certain tolerance; and
    generating the recommended routes with the recorded road information.

2. The method according to claim 1, wherein the acquiring route description information input by a user, and acquiring a route broken line graph with the route description information comprises:
    acquiring a track of the route broken line graph track drawn by the user, to extract the route broken line graph using the track of the route broken line graph; or
    acquiring an image which is imported by the user and contains pattern data, and extracting a broken line graph from the pattern data as the route broken line graph; or
    acquiring a route description text input by the user, analyzing the route description text to obtain route shape information, searching for an image containing pattern data corresponding to the route shape information to extract a broken line graph from the pattern data as the route broken line graph; or
    acquiring a route description sentence input by the user, analyzing the route description sentence to obtain route shape information, searching for an image containing pattern data corresponding to the route shape information to extract a broken line graph from the pattern data as the route broken line graph.

3. The method according to claim 2, wherein the extracting a broken line graph from the pattern data comprises:
    extracting broken line graphs of the pattern data from the image obtained by the searching based on an edge detection algorithm;
    clustering the broken line graphs based on feature points of the broken line graphs; and
    selecting one broken line graph from a cluster obtained by the clustering operation as the route broken line graph.

4. The method according to claim 2, before the extracting a broken line graph from the pattern data, further comprising:

converting the image obtained by the searching into binary images; and deleting the image containing more than one connected domain.

5. The method according to claim 1, wherein the pre-constructing of a corner database using the road network data comprises:

for each corner, extracting all combinations with the corner as a road intersecting point;

determining comprised angles formed between roads in each combination in sequence in a preset direction to form the angle sequence corresponding to the combination;

recording the angle sequences corresponding to all the combinations of the corner; and establishing inverted indexes of the corners with the angle sequences as keys, so as to construct the corner database.

6. The method according to claim 5, wherein the corresponding angle sequence of the intersecting point in the route broken line graph is determined by:

determining comprised angles formed between the lines at the intersecting point in the route broken line graph in sequence in a preset direction, so as to form the angle sequence corresponding to the intersecting point.

7. The method according to claim 5, wherein the selecting one of the intersecting points comprises:

querying the corner database using the angle sequence corresponding to each intersecting point, and determining the number of corners hit by each intersecting point; and selecting the intersecting point which hits the smallest number of corners.

8. The method according to claim 5, wherein the querying the road network data using a corresponding angle sequence of the selected intersecting point in the route broken line graph, so as to obtain corners matched with the selected intersecting point as candidate corners comprises:

querying the corner database using the angle sequence corresponding to the selected intersecting point, and taking the hit corners as the candidate corners respectively.

9. The method according to claim 1, wherein if the route description information does not contain route position information, the querying the road network data comprises querying the road network data within a first distance range from a current position of the user preset by the user; and if the route description information contains the route position information, the querying the road network data comprises querying the road network data corresponding to a route position contained in the route position information.

10. The method according to claim 1, wherein the recording a mapped road position if all lines of the route broken line graph are mapped onto connected roads comprises:

if all the end points of the route broken line graph are mapped onto the road, determining whether all the lines of each route broken line graph are connected on the road where all the end points are mapped, and if yes, recording the mapped road information; or, if the end points in the route broken line graph which are mapped onto the road exceed a preset proportion, determining whether the end points which are not mapped onto the road have a road in a preset second distance range, and if yes, mapping the end points which are mapped onto the road onto the road in the preset second distance range; and determining whether all the lines of each route broken line graph are connected on the road where the end points are mapped, and if yes, recording the mapped road information.

11. The method according to claim 1, wherein the route description information comprises route length information;

in the process of equally scaling the route broken line graph in equal proportions, if a length of a road corresponding to the road information of the mapping exceeds the requirement set by the information on route length, an amplification of the scaling in equal proportions is stopped.

12. The method according to claim 1, further comprising:

providing a route recommendation interface for displaying the recommended routes.

13. The method according to claim 12, wherein the route recommendation interface comprises a tab component for each recommended route, and the tab component displays attribute information of the corresponding route;

when one route tab is selected, the route corresponding to the selected route tab is displayed on a map interface.

14. The method according to claim 13, wherein the attribute information comprises at least one of:

the route length information, distance information of the route from the user, and similarity information of the route to the route broken line graph.

15. The method according to claim 12, wherein the route recommendation interface further comprises:

a navigation component or a track recording component;

wherein the navigation component is displayed when the distance between the selected route and the user is greater than or equal to a preset first distance threshold, the track recording component is displayed when the distance between the selected route and the user is less than or equal to a preset second distance threshold, the first distance threshold being greater than the second distance threshold;

the navigation component is configured to display navigation information from the position of the user to the selected route after triggered;

the track recording component is configured to record a route track of the user after triggered.

16. An electronic device, comprising:

at least one processor; and a memory communicatively connected with the at least one processor;

wherein the memory stores instructions executable by the at least one processor, and the instructions are executed by the at least one processor to enable the at least one processor to perform a method for determining a route to be presented to a user by a terminal device, wherein the method comprises:

acquiring route description information input by a user to extract a route broken line graph with the route description information; and matching the route broken line graph in road network data to obtain the route matched with the route broken line graph, so as to generate recommended routes, wherein this step specifically comprises:

extracting intersecting points in the route broken line graph, each of which is formed by intersecting at least two lines;

selecting one of the intersecting points, and querying the road network data using a corresponding angle sequence of the selected intersecting point in the route broken line graph, an angle sequence of the intersection point being formed by included angles between lines at the intersection point in sequence in a counterclockwise direction or in a clockwise direction, and recording the angle sequences corresponding to all the combinations of the corners, so as to obtain corners matched with the selected intersecting point with a certain tolerance as candidate corners;

traversing the candidate corners, matching the intersection in the road network data with the angle sequence corresponding to the intersection point from the intersection point in the route contour, such that the angle sequence of the intersection point is consistent with the angle sequence of the intersection, and fixedly mapping the selected intersecting point to the positions of the candidate corners, equally scaling the route broken line graph in the road network data, and recording road information of the mapping if all end points of the route contour are mapped onto the road and all lines of each route broken line graph are connected on the road where all the end points are mapped with a certain tolerance; and generating the recommended routes with the recorded road information.

17. The electronic device according to claim 16, wherein the acquiring route description information input by a user, and acquiring a route broken line graph with the route description information comprises:

acquiring a track of the route broken line graph track drawn by the user, and to extract the route broken line graph using the track of the route broken line graph; or acquiring an image which is imported by the user and contains pattern data to extract a broken line graph from the pattern data as the route broken line graph; or acquiring a route description text input by the user, analyzing the route description text to obtain route shape information, searching for an image containing pattern data corresponding to the route shape information to extract a broken line graph from the pattern data as the route broken line graph; or acquiring a route description sentence input by the user, analyzing the route description sentence to obtain route shape information, searching for an image containing pattern data corresponding to the route shape information to extract a broken line graph from the pattern data as the route broken line graph.

18. A non-transitory computer-readable storage medium storing computer instructions therein, wherein the computer instructions are used to cause the computer to perform a method for determining a route to be presented to a user by a terminal device, wherein the method comprises:

acquiring route description information input by a user to extract a route broken line graph with the route description information;

matching the route broken line graph in road network data to obtain the route matched with the route broken line graph, so as to generate recommended routes, wherein this step specifically comprises:

extracting intersecting points in the route broken line graph, each of which is formed by intersecting at least two lines;

selecting one of the intersecting points, and querying the road network data using a corresponding angle sequence of the selected intersecting point in the route broken line graph, an angle sequence of the intersection point being formed by included angles between lines at the intersection point in sequence in a counterclockwise direction or in a clockwise direction, and recording the angle sequences corresponding to all the combinations of the corners, so as to obtain corners matched with the selected intersecting point with a certain tolerance as candidate corners;

traversing the candidate corners, matching the intersection in the road network data with the angle sequence corresponding to the intersection point from the intersection point in the route contour, such that the angle sequence of the intersection point is consistent with the angle sequence of the intersection, and fixedly mapping the selected intersecting point to the positions of the candidate corners, equally scaling the route broken line graph in the road network data, and recording road information of the mapping if all end points of the route contour are mapped onto the road and all lines of each route broken line graph are connected on the road where all the end points are mapped with a certain tolerance; and generating the recommended routes with the recorded road information.

* * * * *